June 29, 1965  O. D. PRITCHETT ETAL  3,191,416
PIPE FORMING MACHINE
Filed Dec. 24, 1962  7 Sheets-Sheet 3

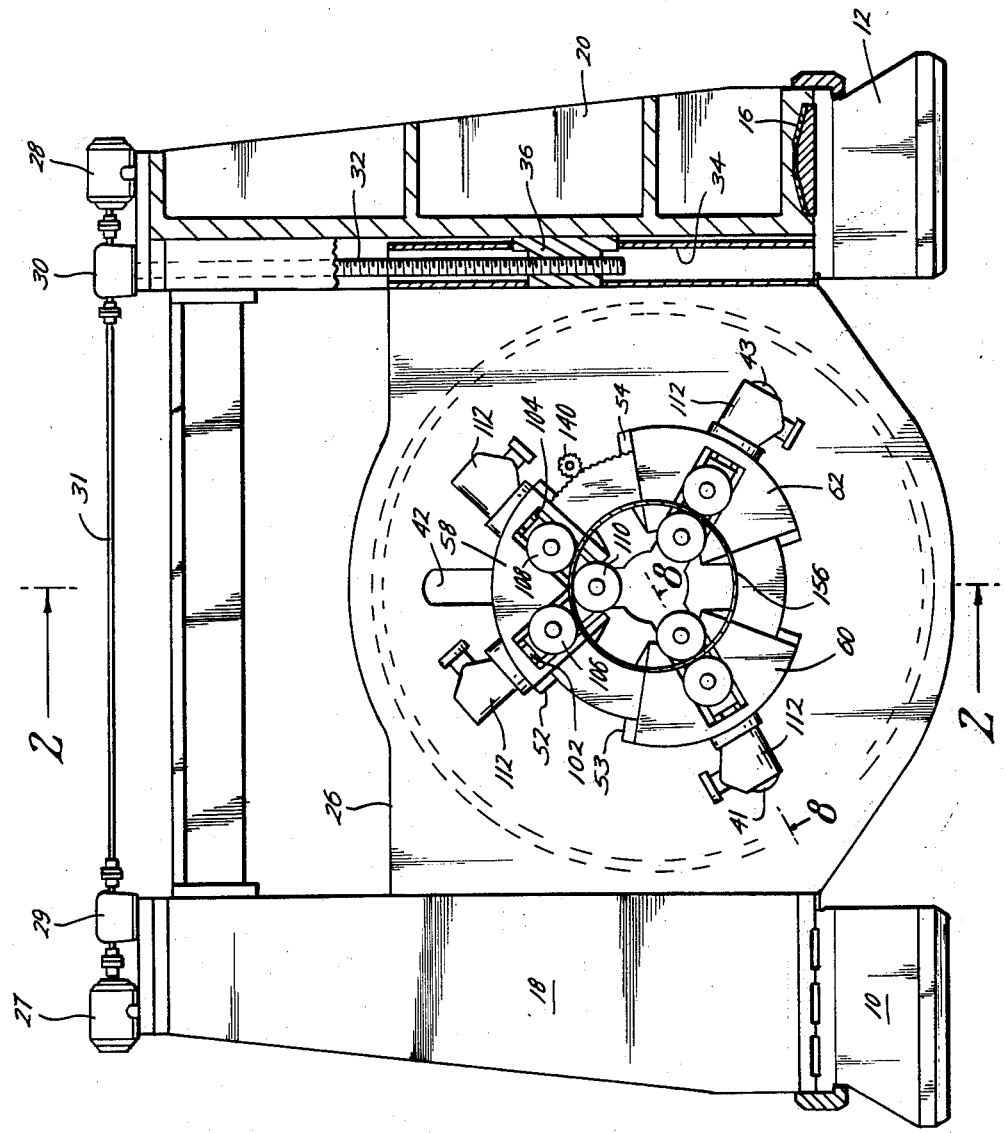

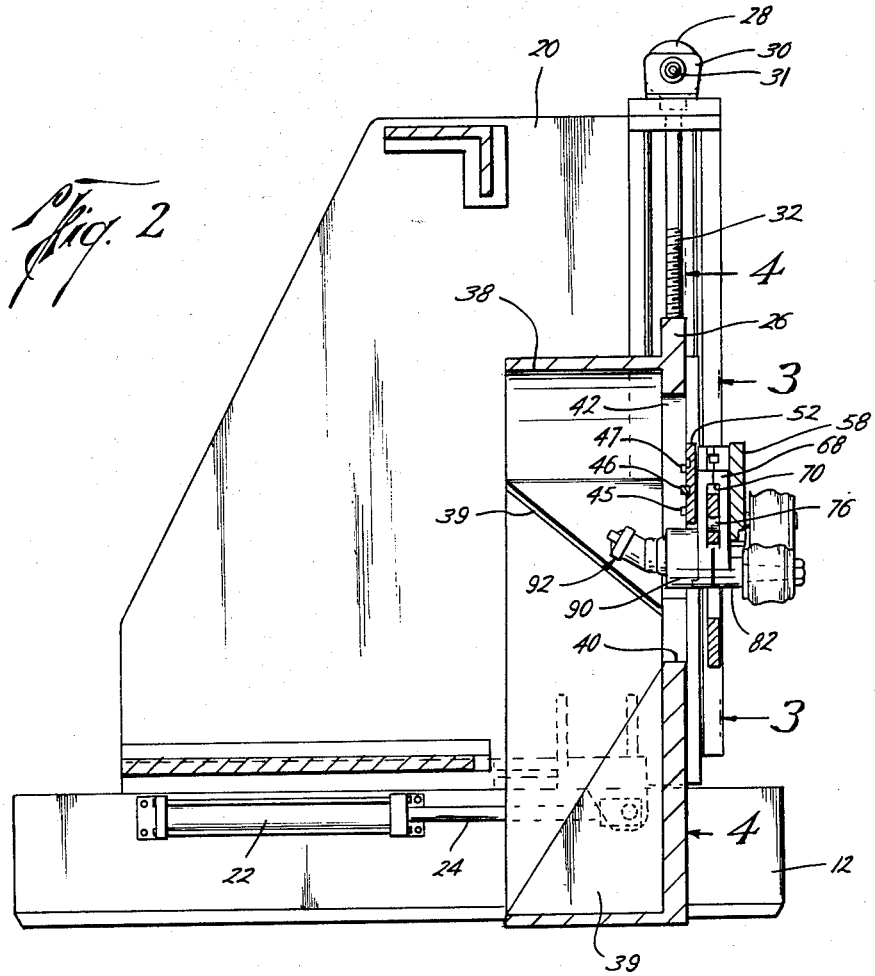
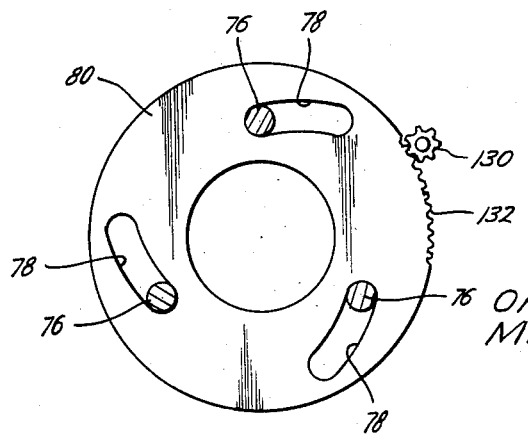
Oris D. Pritchett
Michael W. Zolton
INVENTORS

Oris D. Pritchett
Michael W. Zolton
INVENTORS

BY
ATTORNEY

June 29, 1965 O. D. PRITCHETT ETAL 3,191,416
PIPE FORMING MACHINE
Filed Dec. 24, 1962 7 Sheets-Sheet 4
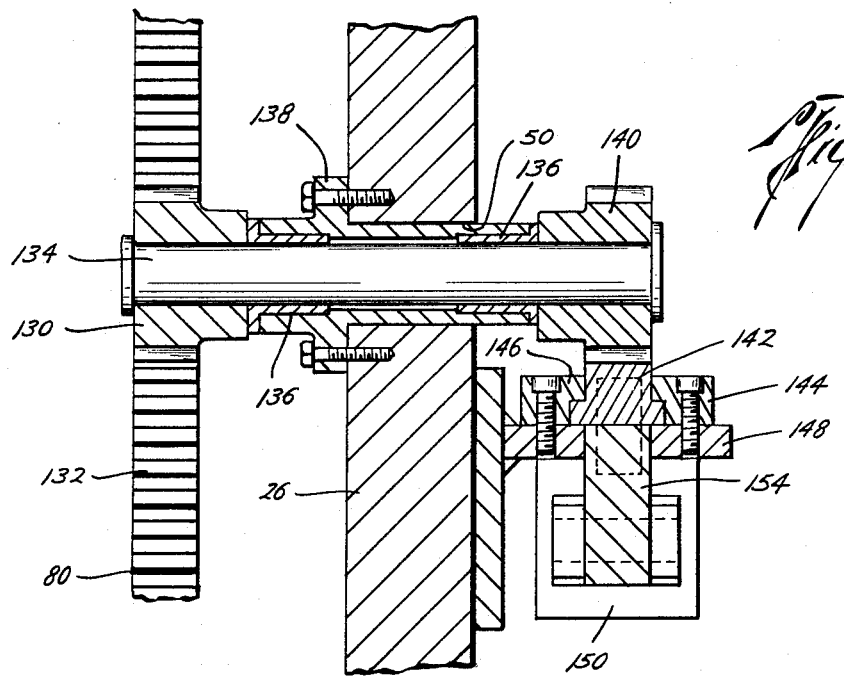
Fig. 6
Fig. 7
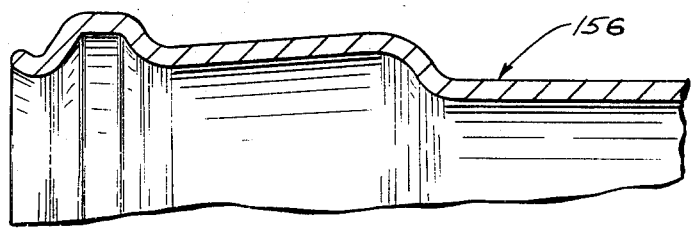
Oris D. Pritchett
Michael W. Zolton
INVENTORS
BY
ATTORNEY Oris D. Pritchett
Michael W. Zolton
INVENTORS

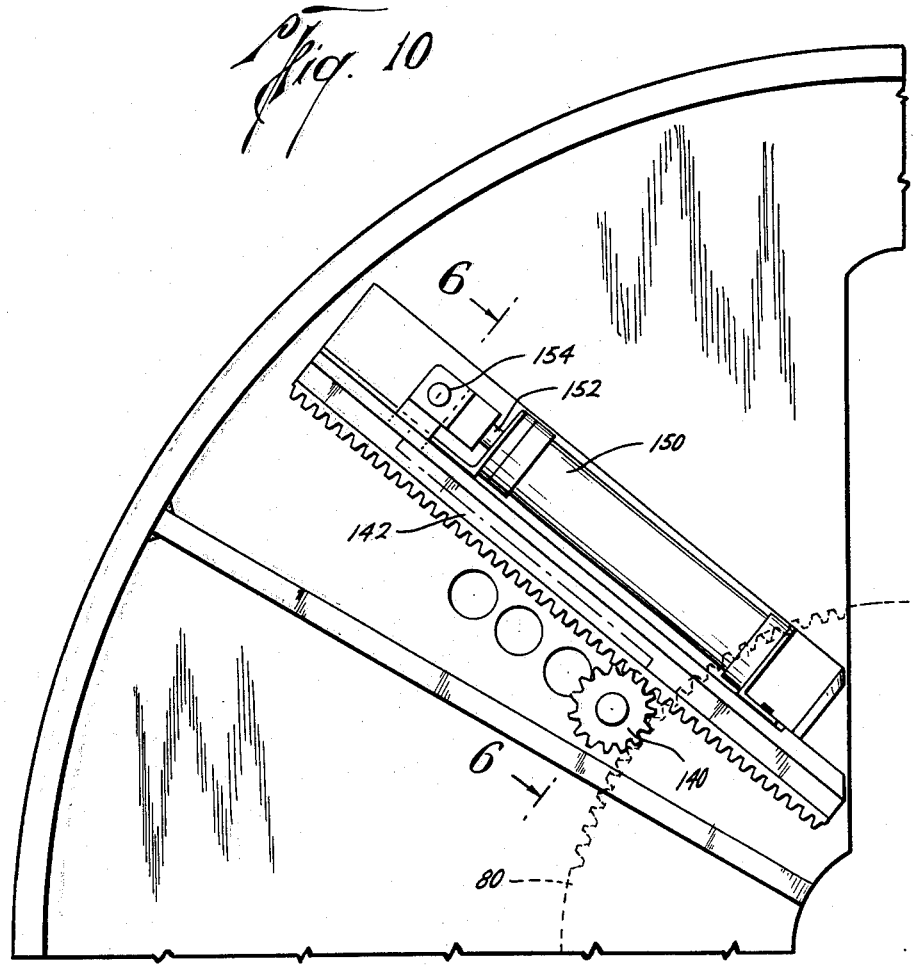

United States Patent Office 3,191,416
Patented June 29, 1965

3,191,416
PIPE FORMING MACHINE
Oris D. Pritchett and Michael W. Zolton, Houston, Tex., assignors to Pritchett Engineering & Machine, Inc., Houston, Tex., a corporation of Texas
Filed Dec. 24, 1962, Ser. No. 246,821
1 Claim. (Cl. 72—106)

This invention relates to pipe forming machines and more particularly it relates to apparatus used for the purpose of forming a desired shape such as a bell on the end of a tubular member.

A principal object of this invention is to provide apparatus for rolling various desired forms on the ends of tubular members, particularly large diameter, heavy wall pipe such as is used in cross-country pipelines. It may for example be desirable to form a bell on one end of a pipe joint in order that the end of another pipe joint can be inserted therein to form a coupling between the two joints.

Another object of the invention is to provide apparatus for forming desired shapes on the ends of tubular members at a high rate of production. This is accomplished in the apparatus of this invention by utilizing novel means which provide power movement of the various elements of the apparatus required for the forming operation.

Still another object of the invention is to provide apparatus which can form desired shapes on the ends of pipes of a large number of different diameters. Thus, means are provided for readily adjusting the position of the working members of the apparatus so that they can engage a variety of diameters of tubular members.

The accomplishment of these and other objects of the invention will become more apparent upon consideration of the following description and of the accompanying drawings, wherein FIGURE 1 is a front elevational view of a preferred embodiment of this invention, parts being broken away for clarity;

FIGURE 2 is a vertical sectional view of the embodiment of FIGURE 1 taken at line 2—2 of FIGURE 1;

FIGURE 3 is a front view of a portion of the embodiment shown in FIGURES 1 and 2 taken at line 3—3 of FIGURE 2;

FIGURE 6 is an enlarged sectional view of another portion of the embodiment shown in FIGURE 1;

FIGURE 7 is a cross-sectional view of a part of the end of a tubular member formed by means of the apparatus of this invention;

FIGURE 10 is an enlarged elevational view of a portion of the embodiment shown in FIGURE 1.

Figure 4:
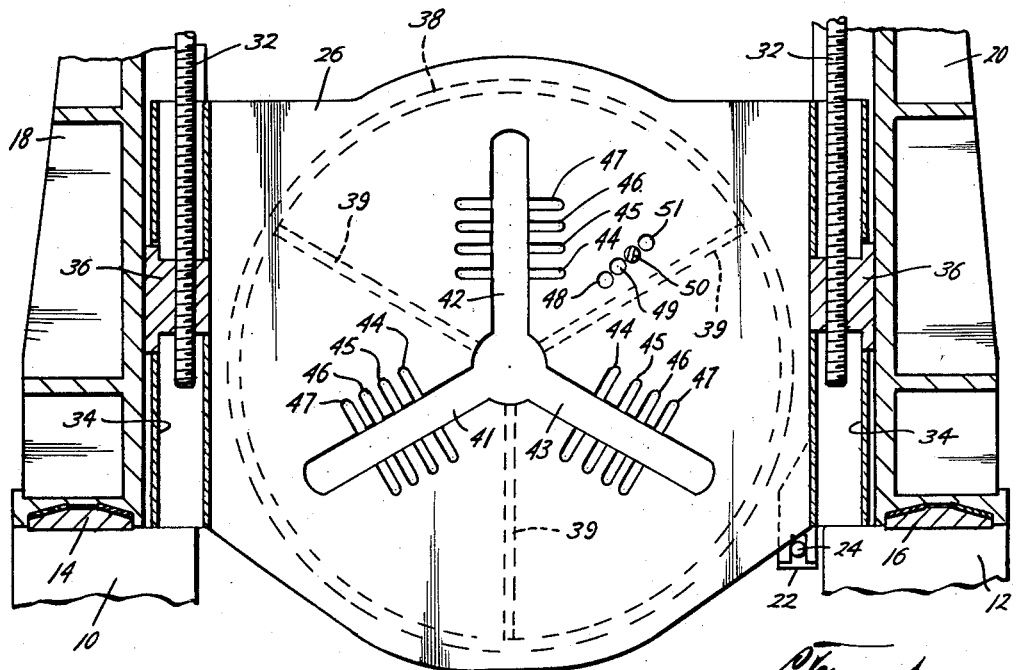
FIGURE 4 is a front elevational view of a greater portion of the embodiment of the apparatus shown in FIGURES 1 to 3 taken at line 4—4 of FIGURE 2.

Referring first to FIGURE 1, it will be seen that in a preferred embodiment the apparatus comprises a pair of base members 10, 12 on top of which are provided ways 14 and 16 respectively. The ways 14 and 16 slidably support vertical standards 18 and 20 for longitudinal movement of the standards relative to the base members 10 and 12. A fluid cylinder 22 is mounted on one of the base members in a conventional manner and has its piston rod 24 attached to standard 20. By the provision of fluid under pressure to fluid cylinder 22 by means of fluid conduit (not shown), the standards 18 and 20 are made to slide longitudinally of the base members on the ways 14 and 16. The ways are suitably lubricated in a manner well known in the art.

The standards 18 and 20 support between them a face plate 26. Means are provided on each of the standards operably engaging the face plate for elevating and lowering the face plate as desired. Such means includes a motor 27, 28 on top of each standard, each of which drives a gear box 29, 30. The gear boxes are connected together by means of a shaft 31 to insure their operation at the same speed. The gear boxes 29, 30 comprise right angle drive gear trains, the output shaft of each of which extends downwardly therefrom. As shown in FIGURES 1 and 2, the output shaft of gear box 30 rotates a lead screw 32 which extends downwardly through and is rotatably received within a vertical passageway 34 formed in one edge of the face plate and engages a nut 36 which is attached to said edge of the face plate. As is shown in FIGURE 4, similar structure is provided on the opposite edge of the face plate. It will be appreciated that motors 27 and 28 are reversible so that upon operation of the motors the face plate 26 will be caused to move upwardly or downwardly as desired.

A preferred embodiment of the face plate 26 is best seen in FIGURES 2 and 4. In the embodiment shown, the face plate generally comprises a flat plate provided with suitable bracing 38, 39 to impart rigidity thereto. Preferably the face plate is provided with a central opening 40 therethrough and with equally spaced slots 41, 42 and 43 diverging radially therefrom. A plurality of keyways 44, 45, 46 and 47 traverse each slot. A plurality of radially spaced apart holes 48, 49, 50 and 51 are also formed in the face plate intermediate two of the slots for a purpose which will hereinafter become apparent.

Figure 8:
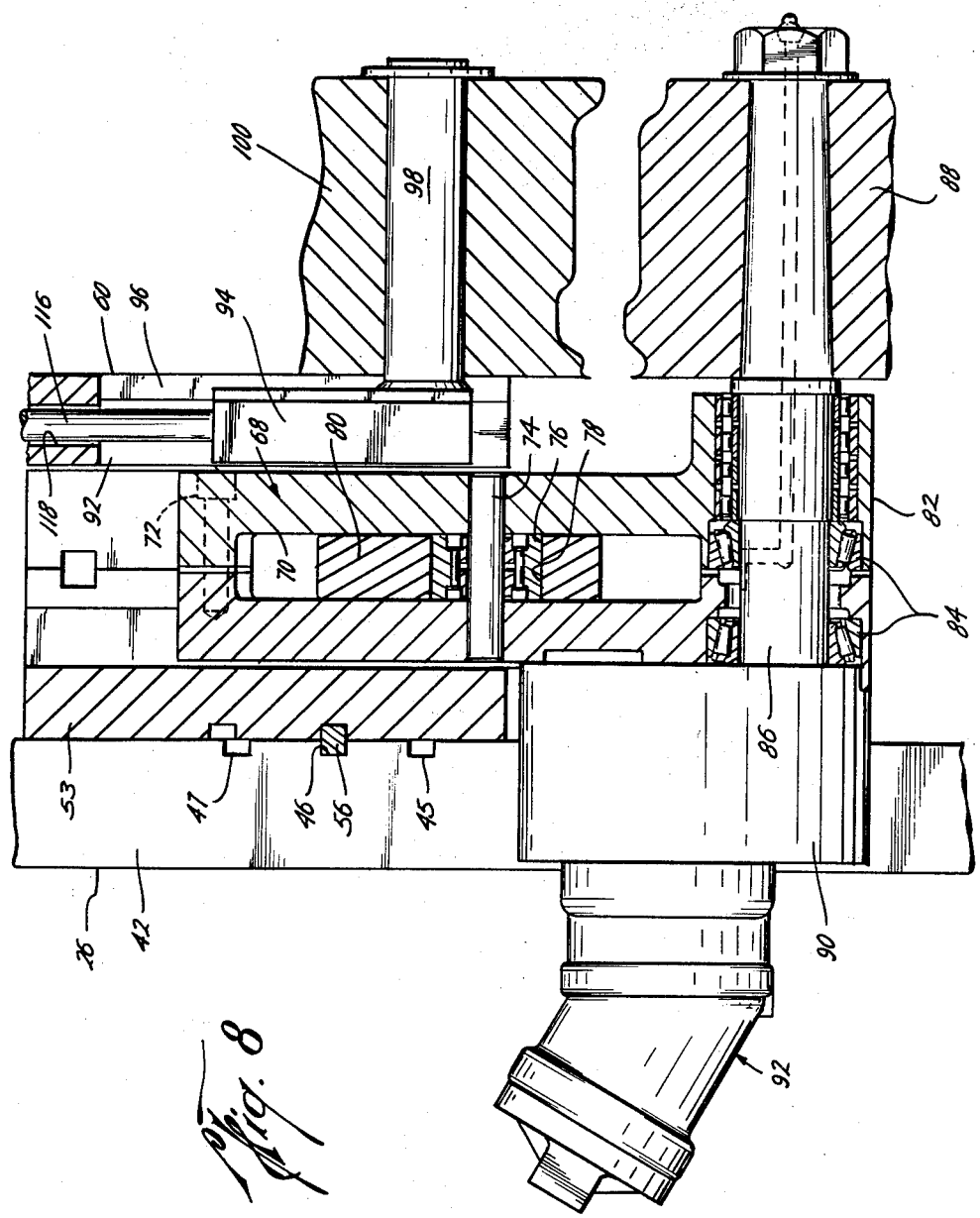
FIGURE 8 is an enlarged sectional view of a portion of the apparatus shown in FIGURE 1 taken at line 8—8 of FIGURE 1.

As is shown in FIGURES 1, 2 and 8, a plurality of back segments 52, 53 and 54 are attached to the front of the face plate, as by means of bolts (not shown). The back segments are keyed to the face plate by means of a key 56 in keyway 46, so as to properly position the segment with respect to the center of the face plate. It will be apparent that a segment may be located at any one of a plurality of positions by utilizing a different one of the keyways 44, 45, 46 and 47.

Figure 9:
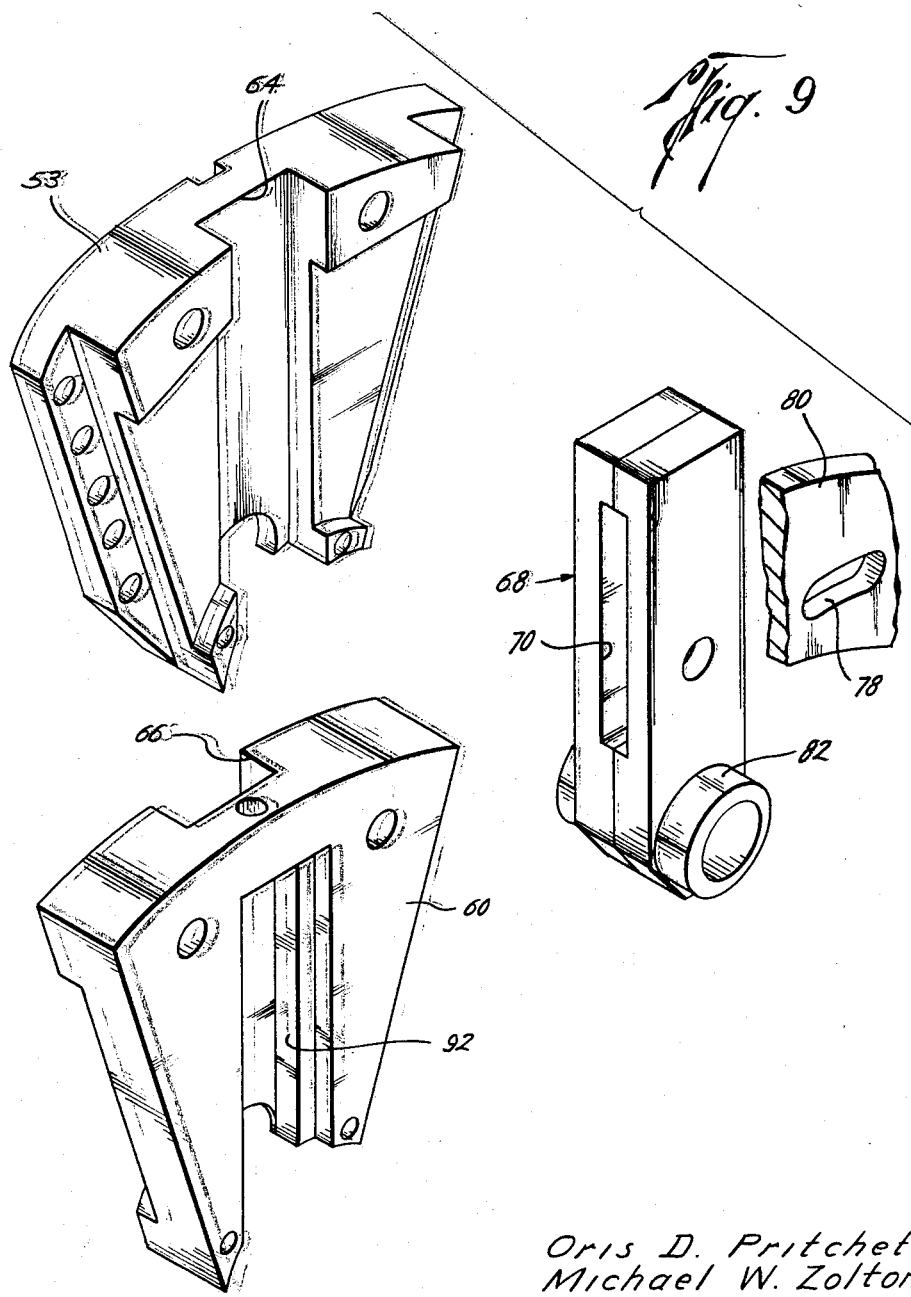
FIGURE 9 is an enlarged exploded view of a portion of the embodiment shown in FIGURE 1.

A front segment 58, 60 or 62 is attached to each back segment as by means of bolts (not shown). The exploded view shown in FIGURE 9 depicts typical back and front segments 53 and 60. As is seen here, the back segment 53 has a front groove and the front segment 60 has a back groove 66. When the segments are fastened together these grooves form ways in which an inner die guide 68 is slidably received. A typical inner die guide comprises a rectilinear member having an aperture 70 extending transversely therethrough in a direction parallel to the face of the face plate. The inner die guide, for convenience in manufacture, is preferably made in two pieces which are fastened together as by means of cap screws 72 (see FIGURE 8). At approximately the center of the transverse aperture 70 a cam shaft 74 is mounted in the inner die guide 68 and traverses the aperture perpendicularly to the face plate. The cam shaft has rotatably mounted thereon within the aperture 70 a cam roller 76. The cam roller functions as a cam follower.

In a preferred embodiment the cam roller 76 is operably positioned within a camming groove 78 formed in a cam ring 80. The cam ring 80 is a floating ring which passes through each of the transverse apertures 70, and normally has its center at substantially the center of the face plate, although by reason of its floating-type installation, it is free to move off-center of the face plate when necessary. As shown in FIGURE 3 the cam ring is a flat ring-shaped member having provided therein three camming grooves 78, or one groove for each inner die guide. The camming grooves are substantially equally spaced and are substantially in the form of segments of spirals around the center of the cam ring, one end of each groove being nearer the center than its opposite end. It will be apparent that each camming groove provides inner and outer camming surfaces, and that upon rotation of the cam ring 80 about its center the camming surfaces bearing upon the cam rollers 76 will cause the cam rollers to move either radially inwardly or radially outwardly. Thus the inner die guides are also caused to move radially inwardly or radially outwardly.

Each inner die guide 68 is provided substantially at its radially inward end with a bearing housing portion 82. The bearing housing portion 82 has mounted within it bearings 84 which rotatably support a die shaft 86. The die shaft extends perpendicularly from the face plate and has mounted on its outwardly extending end for rotation therewith, a die 88. On its inner end the die shaft is operably engaged by a conventional reduction gear unit 90 which operably connects the die shaft 86 with a conventional fluid motor 92 which drives the reduction gear unit. Thus rotation of the fluid motor 92 causes rotation of the inner die 88 at a reduced speed.

Each of segments 60 and 62 has in its outer face a front groove 92 which functions as a sliding way for an outer die guide 94 slidably positioned therein. The outer die guides are retained in the grooves 92 by means of gibs 96 which may for example be fastened by means of cap screws (not shown). Each outer die guide has attached to its radially inward end a die shaft 98 which extends in a direction perpendicular to and away from the face of the face plate and therefore parallel to the die shaft 86 for the inner die. The die shaft 98 has rotatably mounted thereon an outer die 100. Outer die 100 is positioned radially outwardly from inner die 88.

Front segment 58 differs from front segments 60 and 62 in that it is provided with two front grooves 102 and 104, as is apparent in FIGURE 1. Grooves 102 and 104 provide ways for the guiding of two outer die guides 94 for movement toward and away from the center of the face plate. Thus two outer dies 106 and 108 are provided for a movement inwardly toward or outwardly away from inner die 110 as shown in FIGURE 1.

Figure 5:
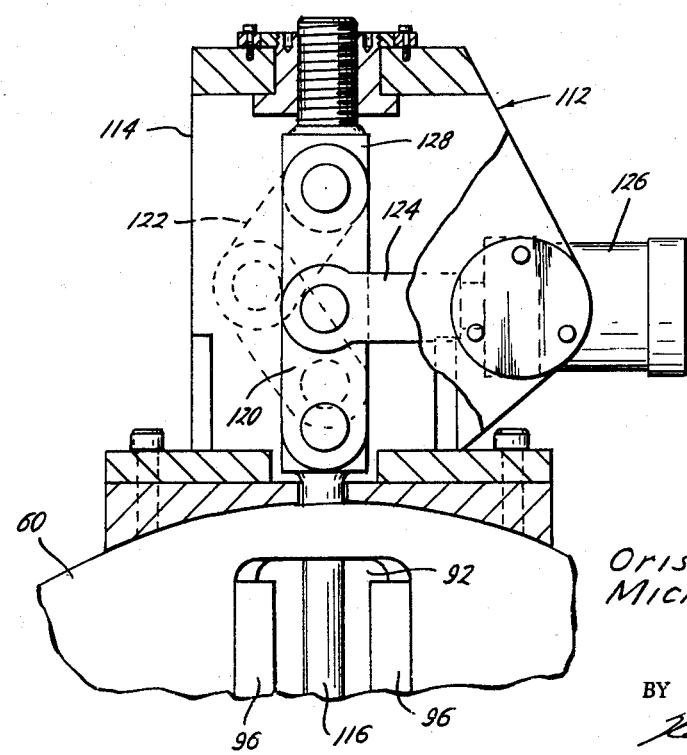
FIGURE 5 is an enlarged sectional view of a portion of the embodiment shown in FIGURE 1.

Means are provided for adjusting the positions of the outer dies to various distances from the center of the face plate as required for various diameters of tubular members to be formed on the apparatus of this invention. Such means comprise a fluid cylinder and crank mechanism indicated generally at 112 in FIGURE 1 and shown more fully in FIGURE 5. A crank housing 114 is attached to the outer periphery of a front segment 60. A rod 116 is attached to and extends radially outwardly from the outer die guide 94 (see FIGURE 8) and is slidably received in an opening 118 communicating between the outer periphery and the outer groove 92 of the segment 60. The outer end of the rod 116 is pivotally attached to one arm 120 of the crank. The other end of arm 120 is pivotally attached to one end of a second arm 122 and to the rod 124 of a fluid cylinder 126. The opposite end of rod 122 is pivotally attached to a mounting bolt 128 which is fastened to the housing. The fluid cylinder 126 is pivotally mounted in the housing. Thus it will be seen that actuation of the fluid cylinder 126 will cause the rod 124 to move to the left as viewed in FIGURE 8, and therefore break the crank and cause rod 116 and guide 94 to move radially outwardly. Two such fluid cylinder and crank mechanisms are provided on the periphery of segment 58 to provide for the movement of both the outer die guides in this segment.

Rotation of the cam ring 80 is effected by means of a pinion 130 which engages gear teeth 132 cut in a portion of the circumference of the cam ring (see FIGURE 3). Pinion 130 is mounted upon a pinion shaft 134 for rotation therewith. The shaft 134 extends through one of the openings 48, 49, 50 or 51 in the face plate 26 and is rotatably received therein by means of bearings 136 (see FIGURE 16). A bearing housing 138 is provided for retaining the bearings. Bearing housing 138 is attached to the face plate as by means of cap screws so that it may readily be positioned at various locations as within one of the other apertures 48, 49, 50 or 51. On the end of shaft 134 opposite that which has secured thereto the pinion 130 another pinion 140 is mounted. Pinion 140 operably engages a rack 142. Rack 142 is slidably mounted in guides 144, 146, and 148 for movement radially of the face plate. Such sliding radial movement is imparted to the rack by means of a fluid cylinder 150, the piston rod 152 of which is attached to the rack by means of a bracket 154.

In operation, a piece of pipe to be formed, designated by reference numeral 156 in FIGURE 1, is positioned in front of the apparatus, being supported by means (not shown) allowing rotation of the pipe about its axis. The face plate of the apparatus of this invention is then elevated or lowered by means of the motors 27, 28, as necessary for alignment with the end of the pipe. Fluid cylinders 126 of the fluid cylinder and crank mechanism 112 are actuated as required for positioning of the outer dies. These dies are located so that they will form a backup for the inner dies and engage the end of the pipe in its formed condition. Fluid under pressure is then supplied to fluid cylinder 150 to cause rotation of the cam ring 80 in a manner to move the inner dies inwardly to the extent necessary to allow the inner dies to be inserted within the interior of the end of the pipe in its preformed condition. Fluid cylinder 22 is then actuated to move the standards and thereby the face plate and the dies toward the end of the pipe to insert the inner dies within the end of the pipe. Fluid is then supplied to the fluid motors 92 to cause the inner dies to begin to rotate, and fluid cylinder 150 is actuated to cause rotation of the cam ring in a direction to urge the inner dies radially outwardly toward the outer dies to engage the interior surface of the end of the pipe. Such engagement of the rotating inner dies will cause the pipe to rotate. Pressure is maintained on cylinder 150 during this rotation to continuously bias the inner dies radially outwardly while the pipe is being rotated. Thus the pipe is gradually formed by the inner dies to a shape such as, for example, that shown in FIGURE 7. Upon engagement of the rotating pipe with the outer dies, the outer dies will begin to rotate and thereby provide forming of the end of the pipe both by the inner dies and by the outer dies. Further radially outward movement of the inner dies will continue until the end of the pipe is completely formed, at which time the pressure is removed from the fluid cylinder 150 and pressure is applied to the opposite side of cylinder 150 to move the inner dies inwardly to disengage them from the pipe. Fluid flow to the fluid motors 92 is then stopped to stop the rotation of the inner dies, and pressure is applied to the fluid cylinders 126 to actuate the crank composed of arms 120 and 122 to retract the outer dies from engagement with the exterior of the pipe. Fluid cylinder 22 is then actuated to retract the face plate and the dies from the end of the pipe and the pipe is left free to be removed so that another joint of pipe can be put into its place for forming in the same manner.

The apparatus of this invention is capable of accommodating a large variety of pipe sizes because of the adjustability of the inner and outer dies as well as the provision of means, comprising the keyways 44, 45, 46 and 47 and the apertures 48, 49, 50 and 51, by which the segments can be positioned at a variety of locations on the face plate. The adjustability of the inner and outer dies without moving of the segments will allow for only a small variation in pipe size whereas greater variations are provided for by moving the segments themselves. It is apparent that the structure of this invention provides rapid means for forming the ends of pipe joints of large diameter and heavy wall thickness at a high rate of speed.

It should be noted that the cam ring 80 floats freely, that is, it is not rigidly attached to any portion of the apparatus but maintains its location with respect to the center of the face plate solely by means of its operative engagement with the cam rollers attached to the inner die guides. Thus the center of the cam ring is not rigidly maintained at the center of the face plate but can move away from this center. This feature is particularly valuable in the case of a pipe joint which is not completely straight because the end of such a pipe joint will run somewhat eccentrically as the pipe joint is rotated. Due to the free floating characteristic, the cam ring can move to accommodate this eccentricity until the pipe engages the outer dies, at which time the pipe will be firmly held between the dies. Despite any such movement of the center of the cam ring from the center of the face plate, the inner dies are still all maintained with substantially equal contact against the interior surface of the pipe so that all of the dies are substantially equally loaded. It will be apparent that if the inner dies were not left free to move to accommodate variations in the pipe that one or the other of the dies and its supporting means might often be overloaded while another die was receiving little or no load.

Although a preferred embodiment of the invention has been shown and described herein the invention is not limited to such preferred embodiment but only as set forth by the following claim.

We claim:

Apparatus for rolling the end of a tubular member which comprises a face plate having a center opening coaxial with said member, at least three radial slots intersecting said center opening, a die-mounting segment adjustably mounted over each slot, an inner die guide slidably mounted in each segment for movement radially of said face plate, a rotatable inner die mounted on each inner die guide and extending perpendicularly from said face plate, means mounted on each said inner die guide for rotating the inner die mounted on said die guide, a floating cam ring rotatably disposed concentric with said center opening, a cam surface on said cam ring for each inner die, a cam roller mounted on each inner die guide engaging a cam surface on said cam roller, means mounted on said face plate operably engaging said cam ring for rotation thereof whereby said inner dies are moved radially outwardly, an outer die guide slidably mounted on each segment for movement radially of said face plate, a rotatable outer die mounted on each outer die guide and extending perpendicularly from said face plate and parallel to and radially outwardly from the inner die mounted on the same segment, and means mounted on said face plate operably engaging each said outer die guide for movement of said outer dies radially of said face plate.

References Cited by the Examiner

UNITED STATES PATENTS

| 686,137 | 11/01 | Rogers | 153—79 |
| 1,865,314 | 6/32 | Gruber | 80—13 |
| 2,016,735 | 10/35 | Abramson et al. | 153—79 |
| 2,126,509 | 8/38 | Severin | 80—13 |
| 2,305,794 | 12/42 | Roeckner | 80—13 |
| 2,618,182 | 11/52 | Teetor | 153—79 |
| 3,070,054 | 12/62 | Grieten | 153—64 |

FOREIGN PATENTS 495,079 11/38 Great Britain.

MICHAEL V. BRINDISI, *Primary Examiner.*

ROBERT F. WHITE, *Examiner.*